(12) United States Patent
Crehan et al.

(10) Patent No.: US 11,511,157 B2
(45) Date of Patent: Nov. 29, 2022

(54) DEVICE FOR ASSISTING A DRIVER OF A VEHICLE TO PERFORM PHYSICAL EXERCISES CONNECTED TO A REMOTE SERVER

(71) Applicant: PSA Automobiles SA, Poissy (FR)

(72) Inventors: Gabriel Crehan, Vaucresson (FR); Stephanie Schneider, Suresnes (FR); Thierry Cheriot, Ollainville (FR); Emmanuelle Diaz, St Arnoult en Yvelines (FR)

(73) Assignee: PSA AUTOMOBILES SA, Poissy (FR)

( * ) Notice: Subject to any disclaimer, the term of this patent is extended or adjusted under 35 U.S.C. 154(b) by 468 days.

(21) Appl. No.: 16/613,749

(22) PCT Filed: May 18, 2018

(86) PCT No.: PCT/FR2018/051215
§ 371 (c)(1),
(2) Date: Nov. 14, 2019

(87) PCT Pub. No.: WO2018/234646
PCT Pub. Date: Dec. 27, 2018

(65) Prior Publication Data
US 2020/0070004 A1    Mar. 5, 2020

(30) Foreign Application Priority Data

Jun. 19, 2017 (FR) ...................................... 1755561

(51) Int. Cl.
*A63B 24/00* (2006.01)
*B60W 40/08* (2012.01)
*B60W 40/107* (2012.01)

(52) U.S. Cl.
CPC ......... *A63B 24/0075* (2013.01); *B60W 40/08* (2013.01); *B60W 40/107* (2013.01); *B60W 2540/043* (2020.02); *B60W 2540/18* (2013.01)

(58) Field of Classification Search
CPC .............. A63B 24/0075; B60W 40/08; B60W 2540/043; B60W 2540/18
See application file for complete search history.

(56) References Cited

U.S. PATENT DOCUMENTS 9,968,818 B1 * 5/2018 Vargas ................... A63B 23/16
2010/0015585 A1   1/2010 Baker
(Continued)

FOREIGN PATENT DOCUMENTS

DE           10249415 B3    3/2004
DE         102013222048 A1  4/2015
(Continued)

OTHER PUBLICATIONS

International Search Report for PCT/FR2018/051215 dated Aug. 2, 2018.
Written Opinion for PCT/FR2018/051215 dated Aug. 2, 2018.

*Primary Examiner* — Peter D Nolan
*Assistant Examiner* — Mikko Okechukwu Obioha
(74) *Attorney, Agent, or Firm* — Sandberg Phoenix & von Gontard PC

(57) ABSTRACT

The invention relates to a device (20) for assisting a driver of a vehicle to perform physical exercises, comprising:— means (21) for acquiring data representative of a driving context,—means (22) for determining a level of risk, from the acquired data,—means (23) for selecting at least one physical exercise compatible with the level of risk,—means (24) for transmitting a signal indicating to the driver the at least one selected exercise; characterised in that it further comprises—means (21') for acquiring data representative of a history of exercises performed by said driver, said data
(Continued)

coming from a remote storage,—and in that the means (23) for selecting at least one physical exercise also use said data representative of a history in order to select said at least one exercise.

10 Claims, 2 Drawing Sheets

(56) References Cited

U.S. PATENT DOCUMENTS

| | | |
|---|---|---|
| 2014/0240132 A1 | 8/2014 | Bychkov |
| 2016/0071393 A1 | 3/2016 | Kaplan et al. |
| 2017/0232297 A1* | 8/2017 | Prokhorov ......... A63B 23/0205 482/8 |
| 2017/0355377 A1 | 12/2017 | Vijaya Kumar et al. |

FOREIGN PATENT DOCUMENTS

| | | |
|---|---|---|
| DE | 102014218392 A1 | 3/2016 |
| DE | 102015011048 A1 | 3/2016 |
| DE | 102015105581 A1 | 5/2016 |
| DE | 102015201369 A1 | 7/2016 |
| FR | 2998159 A1 | 5/2014 |
| FR | 3060501 A1 | 6/2018 |

* cited by examiner

DEVICE FOR ASSISTING A DRIVER OF A VEHICLE TO PERFORM PHYSICAL EXERCISES CONNECTED TO A REMOTE SERVER

CROSS-REFERENCE TO RELATED APPLICATIONS

This application is the US National Stage under 35 USC § 371 of International Application No. PCT/FR2018/051215, filed 18 May 2018 which claims priority to French Application No. 1755561 filed 19 Jun. 2017, both of which are incorporated herein by reference.

BACKGROUND

The invention relates to driver-assistance devices and, more particularly, devices enabling physical exercises to be performed.

Coaching applications are known proposing that a user perform physical exercises such as running or yoga. These activities can be performed in different places: in the home, at the office, in a gym, or in a park. Such applications are usually run on mobile devices such as smartphones or digital tablets.

For example, US Pub. No. 20100015585 discloses a method and a device that provides a personalized audiovisual instructive support to help a person to assume positions or perform movements.

However, these devices are not envisaged for use in a stationary or moving vehicle. In particular, a driver of a moving vehicle cannot safely use such devices.

In a driving situation, some controls (the gears, the steering wheel, the brake and accelerator pedals, etc.) must be precisely manipulated by the driver. This can prove to be particularly complicated if the proposed exercises are too complicated or involve too great a cognitive load.

In the French App. No. FR1662563, an assistance device was proposed to perform physical exercises, adapted for use by the driver of a vehicle. One of the drawbacks of such an application is that it is not suitable for successive use in several vehicles, for example hired vehicles or shared vehicles, particularly for taking into account the driver's progress in performing these exercises.

SUMMARY

A device for assisting in the performance of physical exercises is proposed that is suitable for use by a driver of a vehicle and suitable for successive use in several vehicles, for example hired vehicles or shared vehicles, and which takes into account the driver's progress in performing these exercises.

The device for assisting a driver of a vehicle to perform physical exercises comprises:
means for acquiring data representative of a driving context,
means for determining a level of risk from the acquired data,
means for selecting at least one physical exercise compatible with the level of risk,
means for transmitting a signal indicating to the driver the at least one selected exercise, The assistance device further comprises means for acquiring data representative of a history of exercises performed by the driver, the data coming from a remote storage, and that the means for selecting at least one physical exercise also uses the data representative of a history in order to select the at least one exercise.

The assistance device enables a driver of a vehicle to perform physical exercises in total safety. The assistance device enables the exercises proposed to the driver to be adapted based on a level of risk linked to the driving context of the vehicle and based on the level of progress of the driver, the level of progress of the driver being taken into consideration through the history of data.

Advantageously, the assistance device also comprises means for transmitting data representative of the at least one selected exercise to a remote storage.

This enables the data stored in the remote database to be updated.

Advantageously, the data representative of a history of exercises performed by the driver comprises an identification of the driver and of the exercises performed by the driver associated with dates the exercises were performed.

These data make it possible to determine the exercises suited to the progress of the user.

Advantageously, the data representative of a history of exercises performed by the driver also comprise preferences indicating a configuration of the vehicle compartment, the device also being capable of transmitting a command to the vehicle so that the vehicle assumes the configuration indicated in the preferences.

This makes it possible to improve the experience of the user, particularly when the users used the application inside different vehicles. The settings of the compartment made in one vehicle can then be transferred automatically to another vehicle when an exercise is performed.

Advantageously, the data representative of a driving context comprise at least one datum chosen from a speed of the vehicle, an acceleration and/or deceleration of the vehicle, and a change in direction of the vehicle.

The data used make it possible to determine, for example, whether the vehicle is in motion or stationary and to adapt the proposed exercises accordingly.

Advantageously, the assistance device also comprises a memory in which is stored a set of relations between levels of risk, on the one hand, and physical exercises compatible with the levels of risk, on the other.

According to one embodiment, the assistance device comprises a software module run on a computer onboard the vehicle.

According to another embodiment, the assistance device comprises a software module run on a mobile terminal.

The invention also relates to a vehicle which comprises an assistance device as described above.

DESCRIPTION OF THE FIGURES

Further features and advantages of the invention will emerge from the following detailed description and accompanying drawings, in which.

The accompanying drawings can be used not only to complete the invention but also to contribute to its definition, if necessary.

DETAILED DESCRIPTION

Many people wish to use the time spent during a long journey or in traffic jams, including in a hired vehicle, to improve their health or prevent certain disorders.

Health, stress, excess weight, fatigue, alertness or medical problems, such as backache, tendonitis, relaxation of the perineum (for example after giving birth or in the case of incontinence), are problems that are often ignored or for which adequate solutions are not found.

The invention enables this situation to be improved by proposing a device that enables safe performance of a physical exercise in a vehicle. The purpose of the invention is to enable the improvement of the wellbeing and health of the occupants (passengers and/or driver) of the vehicle.

The exercises proposed by the device are selected on the basis of data, such as the speed or position of the vehicle, and enable performance of the proposed exercise without danger inside the vehicle.

The exercises proposed by the device are selected on the basis of the historic data of activities enable the driver to follow his/her progress.

The assistance device can be used in the form of a software application run on a mobile terminal or on a computer onboard the vehicle.

Figure 1:
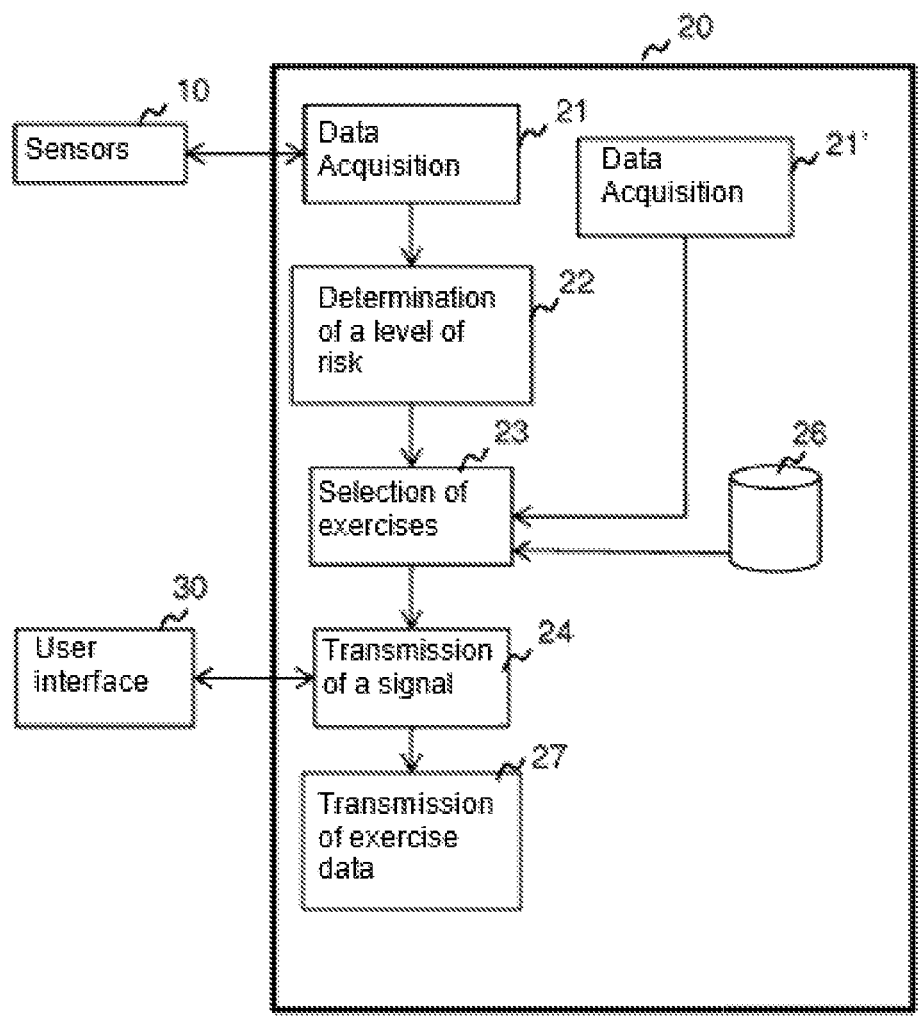
FIG. 1 schematically shows an assistance device.

With reference to FIG. 1, the assistance device comprises:
means 21 for acquiring data representative of a driving context from at least one data source 10,
means 21' for acquiring data representative of a history of exercises performed by the driver, the data coming from a remote storage,
means 22 for determining a level of risk from the acquired data,
means 23 for selecting at least one physical exercise compatible with the level of risk,
means 24 for transmitting a signal indicating to the user the at least one selected exercise.

The data representative of a driving context are, for example: the speed of the vehicle, the acceleration and/or deceleration of the vehicle, a change in direction of the vehicle, geo-tracking data of the vehicle, or any other data making it possible to determine how the vehicle moves.

Advantageously, the data representative of a driving context comprise a road area in which the vehicle is travelling. The road areas have different levels of danger. These areas (listed in descending order of risk) are, for example: town center, town, suburb, urban, extra-urban, county road, national road and motorway.

If the assistance device 20 is built into a mobile terminal, the data source 10 comprises, for example: a geo-tracking module of the mobile terminal. Such a geo-tracking module usually comprises a Global Positioning System (GPS) receiver, an accelerometer, a gyroscope and/or a compass.

Advantageously, the assistance device 20 is connected to a computer onboard the vehicle. In this case, the assistance device 20 uses data coming directly from the vehicle (for example, speed, position, acceleration, etc.).

This provides high quality data representative of a driving context. By doing so, the proposed exercises are even more precisely adapted and the risk of performing an activity in the vehicle is further minimized.

The data representative of a history of exercises performed by the driver comprise, for example:
data of physical activity performed by the driver using the application,
vehicle data such as speed, GPS position, traffic data, a configuration of the vehicle compartment, etc.

A user is identified, for example, by an identification of an account created to access and use the exercise application or by an avatar created in the application.

Figure 2:
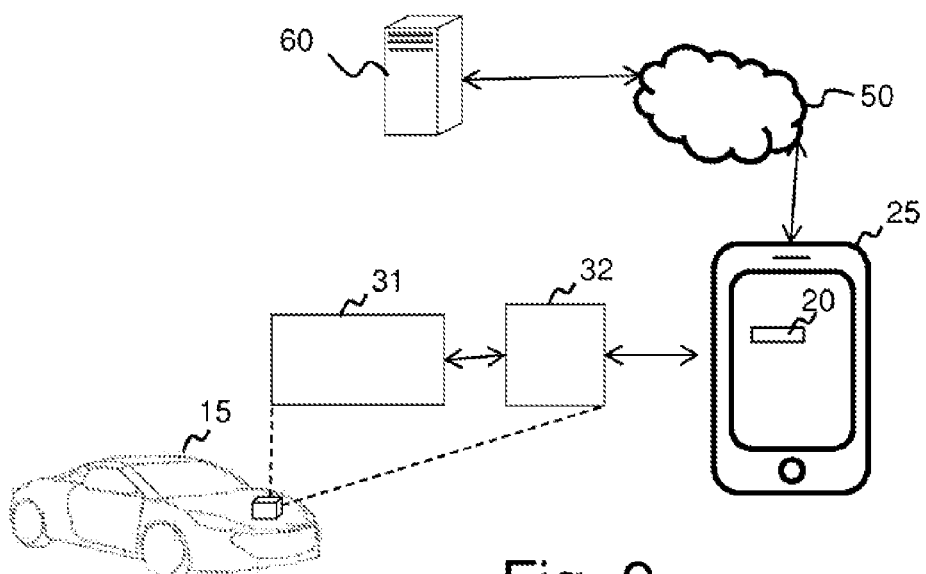
FIG. 2 shows a first embodiment of the assistance device.

With reference to FIG. 2, the data come from a remote storage 60 such as a remote server accessible from a wide-area network 50, such as the Internet.

If the assistance device 20 is built into a mobile terminal, the means 21' for acquiring data representative of a history of exercises uses a communication module of the mobile terminal in order to access the data in the remote storage.

If the assistance device 20 is built into a computer onboard the vehicle, the means 21' for acquiring data representative of a history of exercises uses a communication module of the vehicle in order to access the data in the remote storage.

The transmission (receipt and/or emission) of data representative of a history of exercises is performed by any wireless communication means between the vehicle or the mobile device and the remote server 60.

The transmission means 24 transmits a signal, indicating the exercise to be performed, to a user interface 30.

If the assistance device 20 is built into a mobile terminal, the user interface 30 comprises the screen of the mobile terminal or at least one loudspeaker of the mobile terminal.

If the assistance device 20 is built into a computer onboard the vehicle, the user interface 30 comprises at least one screen built into the vehicle and/or at least one loudspeaker of the vehicle.

The instructions concerning the proposed exercises are delivered in the form of sounds, images or videos.

Advantageously, the media used to indicate the exercises depends on the level of risk determined.

It is understood that more attention is required when looking at a video than when looking at an image. Similarly, more attention is required when looking at an image than when listening to an instruction.

Moreover, audible instructions are preferred during more dangerous situations and videos during less dangerous situations.

The means 22 for determining a level of risk uses the data acquired for estimating a level of risk.

For example, the higher the speed of the vehicle the higher the level of risk of performing an exercise becomes. The relation between the level of risk and the speed of the vehicle can be linear but not necessarily so. Furthermore, the relation can depend on the exercise for which the level of risk is assessed.

Advantageously, the assistance device also comprises a memory 26 in which is stored a set of relations between levels of risks, on the one hand, and physical exercises compatible with the levels of risks, on the other.

If the situation becomes too dangerous (for example, dangerous or high level of risk), the application proposes no exercise.

Moreover, the proposed exercises are adapted according to whether the user is a passenger or driver of the vehicle.

Advantageously, the assistance device also comprises means 27 of transmitting data representative of at least one selected exercise to the remote storage 60. The data can be transmitted at any time of day and at any frequency.

Preferably, the data are sent when the vehicle's engine is switched off. Thus the data can be sent when the driver has completed an exercise session.

The data stored on the remote server 60 are available for all of the vehicles that the driver wishes to use.

In particular, the data can be used to:
enable the driver to continue these exercises whatever his/her choice of mobility (shared vehicle, hired vehicle, etc.);

automatically personalize the vehicle compartment during the exercises (for example, the temperature of the compartment, the ventilation power);

enable continuous monitoring of preferences for the exercises, calories burned and the community of the exercise application.

FIG. 2 shows a first embodiment of an assistance device. In this example, the device 20 is built into a mobile terminal 25. The device uses the GPS function of the mobile terminal 25. With the GPS data, the speed and position can be determined.

Optionally, the mobile terminal 25, in the form of a smartphone in FIG. 2, exchanges data directly with the vehicle's computer 31 through an Application Programming Interface (API) 32. This embodiment enables very precise data to be provided to the device 20. The assessment of the level of risk is thus improved, which provides the driver with a better level of safety.

But the smartphone can also be connected by a high-speed wired (USB) or wireless (Wi-Fi) connection to the vehicle's computer. The computer 31 controls, for example, the display of a touchscreen built into the central part of the vehicle's dashboard. In this case, the computer is equipped with a mirroring solution (for example: Apple CarPlay®, Google Android Auto® or Mirrorlink®) making it possible, during driving, to reproduce in real time on the touchscreen, and with an adapted visual interface, the display generated by the mobile terminal 25.

This configuration thus allows the driver to view the exercises and determine the application on the mobile terminal 25, on the vehicle's touchscreen and to directly control the application via this touchscreen. It is preferable that the videos of the movements to be performed are visible to the driver only when the vehicle is stationary, and when the vehicle is in motion there is a "coach" voice that describes the movements to be performed and the correct manner in which to perform them. A voice has the dual advantage of being a positive stress.

Figure 3:
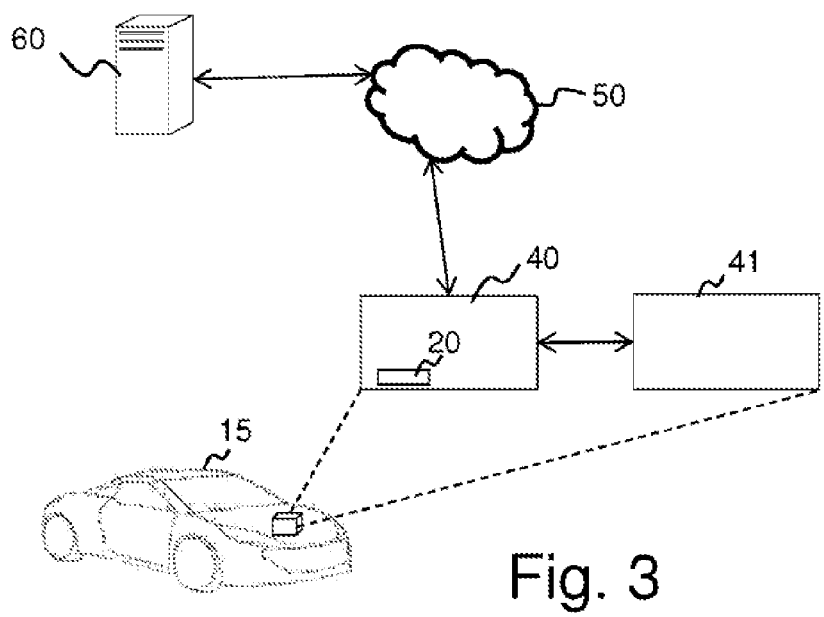
FIG. 3 shows a second embodiment of the assistance device.

FIG. 3 shows a second example of an embodiment of the assistance device. In this example, the assistance device is built into a computer 40 of the vehicle. The vehicle data are then directly available to the assistance device.

This embodiment avoids the use of a mobile terminal. The user interface is, for example, a screen 41 onboard the vehicle 15. Also, the exercise program can be projected on several screens in the vehicle so that everyone can share the session together.

Advantageously, the device also comprises means for acquiring parameters linked to the driver such as his/her identity details (so as to offer him/her personalized exercises).

These parameters are communicated by the user, for example, in the form of a self-declaration entered via an interface of the device (for example, the touchscreen of the mobile terminal on which the application is run).

The assistance device enables the exercise data, generated in the vehicle during the use of the application, to be used outside the vehicle. The data are sent to a remote server 60 and can be shared with other devices or other services.

Thus, the data can be used to improve the user's experience, particularly when he/she uses the application outside his/her own vehicle (for example, with a shared vehicle or hired vehicle).

Adjustments can thus be used from one compartment to another compartment in order to personalize a hired vehicle.

The invention claimed is:

1. An assistance device for assisting a driver of a vehicle to perform physical exercises, the assistance device comprising:
   means for acquiring driving context data, said driving context data being representative of a driving context of the vehicle,
   means for determining a level of risk based on the acquired driving context data,
   means for acquiring exercise data, said exercise data being representative of a history of exercises performed by said driver, said data coming from a remote storage,
   means for selecting at least one physical exercise as a function of the determined level of risk and said exercise data, and
   means for transmitting a signal indicating to the driver the at least one selected exercise.

2. The assistance device according to claim 1, wherein the assistance device further comprises means for transmitting data representative of the at least one selected exercise to a remote storage.

3. The assistance device according to claim 1, wherein the exercise data comprises an identification of the driver and of the exercises performed by the driver associated with dates the exercises were performed.

4. The assistance device according to claim 1, wherein the exercise data also comprise preferences indicating a configuration of the vehicle compartment, the device also being capable of transmitting a command to the vehicle so that the vehicle assumes the configuration indicated in the preferences.

5. The assistance device according to claim 1, wherein the driving context data comprises at least one datum chosen from a speed of the vehicle, an acceleration and/or deceleration of the vehicle, and a change in direction of the vehicle.

6. The assistance device according to claim 1, wherein the assistance device also comprises a memory in which is stored a set of relations between levels of risk, on the one hand, and physical exercises compatible with said levels of risk, on the other.

7. The assistance device according to claim 1, wherein the assistance device comprises a software module run on a computer onboard the vehicle.

8. The assistance device according to claim 1, wherein the assistance device comprises a software module run on a mobile terminal.

9. A vehicle comprising the assistance device according to claim 1.

10. A method for assisting a driver of a vehicle to perform physical exercises in the vehicle, the method comprising:
    acquiring data representative of a driving context of the vehicle,
    determining a level of risk based on the acquired data representative of the driving context,
    acquiring data representative of a history of exercises performed by said driver,
    selecting at least one physical exercise as a function of (a) the level of risk and (b) the data representative of a history of exercises performed by said driver, and
    transmitting a signal indicating to the driver the at least one selected exercise.

* * * * *